United States Patent
Lee

(10) Patent No.: US 6,413,557 B1
(45) Date of Patent: Jul. 2, 2002

(54) SOY-CONTAINING NUTRITION SUPPLEMENT AND PROCESS

(76) Inventor: Kyung Ja Lee, 102-10 66$^{th}$ Rd., Forest Hills, NY (US) 11375

( * ) Notice: Subject to any disclaimer, the term of this patent is extended or adjusted under 35 U.S.C. 154(b) by 19 days.

(21) Appl. No.: 09/580,977

(22) Filed: May 30, 2000

Related U.S. Application Data

(63) Continuation-in-part of application No. 08/887,302, filed on Jul. 2, 1997.

(51) Int. Cl.$^7$ ............................................. A61K 35/78
(52) U.S. Cl. ....................... 424/757; 426/634; 426/507; 426/508; 426/656
(58) Field of Search .......................... 424/757; 426/634, 426/507, 508, 656

(56) References Cited

U.S. PATENT DOCUMENTS

| | | | |
|---|---|---|---|
| 3,901,978 A | 8/1975 | Nelson et al. | 426/565 |
| 4,041,187 A | 8/1977 | Nelson et al. | 426/598 |
| 4,601,910 A | 7/1986 | Saub | 426/634 |
| 5,132,113 A | 7/1992 | Luca | 424/750 |
| 5,242,697 A | 9/1993 | Luca | 426/231 |

OTHER PUBLICATIONS

Volgarev et al., Nutr. Rep. Int. 39(1): 61–72 (1989). Abstract.*
Roger & Jane Ade Stevens; "U.S. 1997 Soyfoods Directory"; Indiana Soybean Development Council; 1997; pp. 3–47.
Soya and Oilseed Blue Book, 2000, Soya Tech Publication, Soyatech, Inc., Bar Harbor Maine, p 224,297,393–394.
Goldman, Jun. 15, 1999, "Soy makers eager to market heart health claim", *Family Practice News* p. 18.
Holt, 1999, *The Soy Revolution*, Dell Publishing, 26–27, 96–97190,192.
Lee, Advertisement: "Dr. K.J.'s Manhattan Diet", Nov. 16, 1999, *Daily News*, New York.
Lee, Advertisement: "The Powers of Soy", Nov. 2, 1999, *Daily News*, New York.
Soya and Oilseed Blue Book, 1999, Soya Tech Publication, Soyatech, Inc., Bar Harbor Maine, pp 130–131, 220–221, 275.
Coffee, 1998, *Metabolism, Integrated Medical Sciences*, First edition, Fence Greek Publishing, pp 339–341.
Cooper, 1998, *Advanced Nutritional Therapies*, Thomas Nelson Publishing, p 224.
Jancin, May 15, 1998, "Soy can bring down patient's cholesterol", *Family Practice News* p. 16.
Pi–Sunyer et al., 1998, "Clinical guidelines in the identification, evaluation and treatment of overweight and obesity in adults: the evidence report", National Institutes of Health, NIH Publication 98–4083, pp. xxiii–xxvii, 73–75.
Gissen, 1996, "Soy: The magic bean? Part II soy and cardiovascular disease", VRP Nutritional News (Aug.) 10:1, 2,8.
Gissen, 1996, "Soy: The magic bean?", VRP Nutritional News (May/Jun.) http://www.vrp.com/soy.htm.
Liu, 1996, *Soybeans: Chemistry, Technology and Utilization*, Chapman and Hall, International Thomson Publishing, New York, pp. 48–52, 56–57, 60–61, 63–67, 93–94, 138–158.
Winter, 1996, *Super Soy: The Miracle Bean*, Crown Trade Paperbacks, New York, pp 24–25, 42, 46–53, 98–101, 175, 178–183.
Soya and Oilseed Blue Book, 1995–1996, Soya Tech Publication, Soyatech, Inc., Bar Harbor Maine, p 269–270.
Karoff, 1994, *The New Blender Book*, Bristol Publishing Enterprises, California, pp. 1–4, 155–166.
Liener, 1994, "Implications of antinutritional components in soybean foods", *Crit Rev Food Sci Nutr* 34:31–67.
Kudou et al., 1991, "Purification and some properties of soybean saponin hydrolase from *Aspergillus oryzae* KO–2", Agric Biol Chem. 55:31–36.
Tsai, 1987, Effects of soy polysaccharide on postprandial plasma glucose, insulin, glucagon, pancreatic polypeptide, somatostatin, and triglyceride in obese diabetic patients, *American Journal of Clinical Nutrition* 45:596–601.
Vitasoy (U.S.A.) Inc., 1987, Publically available product literature, San Francisco, CA.
Friedman and Gumbmann, 1986, "Nutritional improvement of legume proteins through disulfide interchange", *Adv Exp Med Biol* 199:357–389.
Holt et al., 1979, "Effect of gel fibre on gastric emptying and absorption of glucose and paracetamol", *Lancet* 1:636–639.

* cited by examiner

*Primary Examiner*—Jean C. Witz
(74) *Attorney, Agent, or Firm*—Hogan & Hartson LLP

(57) ABSTRACT

A soy-containing nutritional supplement is disclosed which contains high amounts of soy protein, phytonutrients, and soluble and insoluble types of fiber.

20 Claims, No Drawings

SOY-CONTAINING NUTRITION SUPPLEMENT AND PROCESS

CROSS REFERENCE TO RELATED APPLICATION

This application is a continuation-in-part of U.S. patent application Ser. No. 08/887,302, filed Jul. 2, 1997, which application is incorporated herein by reference.

BACKGROUND OF THE INVENTION

The present invention relates to a texturized soy beverage base which includes the soybean hulls and phytonutrients, and to processes for the preparation thereof.

For several decades, particularly in the 1960's and 1970's, numerous studies were conducted to discover the chemistry of the formation of beany flavor during the preparation of soy products. It was found that the characteristic flavor of soy milk in particular, and soy products, in general, results mainly from peroxidation of polyunsaturated fatty acids or esters catalyzed by an enzyme known as lipooxygenase (Wilkens et al. 1967; Wilkens and Lin 1970; Nelson et al. 1971, 1976).

The reaction produces many volatile compounds that can be identified by gas chromatography. Most of these volatile compounds are reported to be ketones, aldehydes, and alcohols, and many of them impart undesirable flavor.

Soymilk is a water extract, so, in some processing steps, water must be incorporated into beans. There are several ways to do so. Most commercial as well as traditional methods involve soaking beans overnight until fully hydrated and then grinding the soaked beans with additional fresh water. The benefits of soaking include reducing the power input required for grinding, causing much less wear on the millstones or blades, leaching out some oligosaccharides, enabling better dispersion and suspension of the solids during extraction, decreasing cooking time, and increasing yields.

The disadvantages of soaking include losses of water soluble solids and induction of biological changes. Lo et al. (1968) studied the effects of soaking soybeans before extraction on the chemical composition of leached solids and soymilk made from soaked beans. They found that as the soaking time increased, larger quantities of water soluble solids leached into the soaking water, including nonprotein nitrogen compounds, soluble sugars, and minerals. On the average, soaking beans for 24 hr resulted in a 5% loss, whereas 72-hr soaking led to a 10% loss of solids. They also observed mild metabolic changes as a result of soaking. Regardless of these changes, they found no measurable difference in the gross composition of the soymilks made from beans soaked for 16 hr (overnight) and 72 hr, although they did not compare these milks with that from unsoaked beans. Soaking also induces hydrolysis of isoflavone aglucones to their glucoside forms, resulting in development of objectionable aftertaste of soymilk (Matsuura et al. 1989).

There are methods for bypassing the soaking stage. Some, such as the hot grinding method, accomplish hydration and grinding in one step. Others make soymilk by first grinding dry soybeans and then blending the flour with water. For example, Hand et al. (1964) reported a method involving dehulling and grinding of dried soybeans followed by slurrying the powder with water. The resultant milk contained about 90% of the total solids. Some commercial processors, such as one in Hong Kong which mass-produces Vitasoy and Taishi Foods Ltd. of Japan, follow Hand et al. by using dry-ground soy flour. In addition, Mustakas et al. (1964) developed a process in which dehulled soybean flakes, properly conditioned with moisture, are fed into an extruder cooker, which provides short-time, high-temperature, high-pressure conditions. The cooked, puffed, and dried material is then finely ground and slurred with water to form soymilk.

The water temperature used for soymilk production is another subject of consideration, because it affects the rate of bean hydration, the rate and type of solids leakage, the rate of metabolic changes, and more importantly, the quality of soymilk. The traditional method calls for room temperature soaking followed by cold grinding. In many new methods, however, particularly those bypassing the soaking step, hot water is normally used in conjunction with blanching or grinding. Wilkens and Hackler (1969) studied the effects of soaking temperature and time on rates of water absorption, nutrient losses, and soymilk yields. They found that the higher the temperature, the faster the rate of soybean hydration. Dehulled soybeans reached fall hydration much faster than whole beans, requiring 2 to 3 hr at 30° C. or 1 hr at 50° C. as compared with 7 hr at 30° C. at 50° C. for the whole beans. At soaking temperatures above 45° C., there was a large decrease in the total solids and carbohydrates recovered in the soymilk and a small decrease in the recovery of protein and fats. The longer the soaking time, the greater the losses. Increasing the temperature of soaking water from 45° to 65° C. followed by hot grinding resulted in a decrease of about 6% in the volume of soymilk obtained from the dehulled soybeans.

Adding alkaline salts such as sodium bicarbonate (baking soda), sodium carbonate, sodium citrate, or sodium hydroxide to the water has also been shown to affect soymilk quality. Soymilk made from water alone has a pH near neutral (6.5–6.8). When added to water during soaking, blanching, or grinding, alkaline salts raise the pH of, and add ions to, the soybean water extract. As a result, soy protein becomes more soluble in the extract. Protein and solid recovery increase. In addition, alkaline salts have been shown to decrease the beany flavor, help inactivate trypsin inhibitors, reduce oligosaccharides, and tenderize the soybean, which makes such processing steps as grinding, heating, and homogenizing faster and easier. However, there are some disadvantages associated with the use of alkali salts. The addition of salts increases costs and salts may not be available in many rural areas. Because alkaline salts raise the pH of soymilk, the addition of an acid for neutralization may be necessary. More importantly, alkaline salts help destroy some key nutrients during processing, including sulfur-containing amino acids and some vitamins, and thus reduce nutritional quality of soymilk. Alkaline salts also slightly darken soymilk and may impart "soapy" flavor (Badenhop and Hackler, 1970, Bourne et al. 1976, Johnson and Snyder (1978).

Although heat treatment has many benefits, extended heating should be avoided, because overheating leads to destruction of such nutrients as essential amino acids and vitamins. Extended heating also alters the functional properties of soy protein to such an extent that they become less coagulated when made into tofu.

In addition to heating temperature and time, the moisture condition prior to and during heat treatment has a significant effect on the effectiveness of TI (trypsin inhibitor) destruction by heat. For example, cooking whole soybeans reduces trypsin inhibitor activity to about 15% of that in raw beans. However, for complete removal of trypsin inhibitors, soaking prior to cooking is necessary, even though soaking has no effects on TI activity (Liu and Markakis 1987).

Based on the activity loss of the purified inhibitors, the Kunitz inhibitor was thought to be more heat labile than the BB inhibitor (Birk 1961). However, DiPietro and Liener (1989) demonstrated that an in situ BB inhibitor is inactivated at a faster rate than the Kunitz inhibitor upon heating.

Heat treatment reduces not only TI activities, but also solubility of the whole seed protein (Anderson 1992). More importantly, excessive heat treatment can cause loss of essential amino acids in soy protein (Rios-Iriarte and Barnes 1966, Skrede and Krogdahl 1985). Therefore, in applying heat to soy products, it is essential to use an optimum condition (temperature, time, moisture, and pressure) to maximize destruction of TI and at the same time to minimize reduction of soy protein solubility as well as loss of essential amino acids. However, this is easier to say than do. In fact, the amount of heat required to eliminate growth inhibitors in raw soybeans is sufficient to destroy cystine. (Rios-Iriarte and Barnes 1966). In actual situations, heat treatments do not completely inactivate all inhibitor activity. The possible adverse effects of residual inhibitors in soy products are largely unknown.

Adjunct treatment with various chemicals, including various thiol-containing compounds (such as cysteine, N-acetyl-cysteine, and glutathione) and sodium sulfite has been found to facilitate inactivation at lower temperatures (Liener 1994). Friedman and Gumbmann (1986) reported the treatment of raw soy flour at 75° C. with 0.03M sodium sulfite for 1 hr completely inactivated trypsin inhibitors, leaving no sulfite residue in the soy proteins. Their rat feeding tests showed that sulfite treatment is better than heat treatment alone in terms of nutritional improvement. However, any treatment of foods with chemicals should be viewed with caution with respect to regulatory issues.

Soybean is usually a single entity as a particular food, but soybeans are consumed in numerous forms, each of which has its own nutrient profile.

The soybean hull is also known as the seed coat. On a dry weight basis, hulls constitute about 8% of the total seed, depending on variety and seed size.

Dry soy hulls contain about 85.7% carbohydrates, about 9% protein, about 4.3% ash, and about 1% lipids. The fatty acid composition of hull lipids was recently found to be significantly different from those of cotyledons and hypocotyl axis (Liu et al. 1995b). For 6 genotypes tested, the average percentages plus or minus the standard deviation of major fatty acids for soy hulls are as follows: for palmitic acid, 23.2%±3.0; for stearic acid, 14.8%±2.5; for oleic acid, 14.9%±3.4; for linoleic acid, 22.7%±5.4; and for linolenic acid, 8.5%±2.4. Soybean hulls also contain three plant sterols, campestrol, stigmasterol, and β-sitosterol. Their rations were found to be 1:1.5:2 (Ibrahim et al. 1990).

There are at least three aspects regarding the significance of soy hulls. First, soy hulls affect the seed hydration rate prior to germination or processing. Second, soy hulls serve as valuable foodstuff. And third, soy hulls possess some potential as a source of dietary fiber and iron for human consumption. During imbibition (soaking) prior to germination or processing into various soyfoods, some soybeans, which are known as hard beans, do not absorb water or enlarge significantly. The occurrence of hard beans is an important defect because hard beans either fail to germinate or affect the quality of soy products. Regarding the water resistant mechanism of hard soybeans, Smith and Nash (1961) observed that the seed coat was the principal barrier to water imbibition and that hard beans usually were smaller and drier than those soybeans that imbibe normally. Saio (1976) examined hard beans by proximate analysis, light microscopy, and scanning electron microscopy and found that compared with normal beans hard beans had higher fiber and calcium content plus denser and tougher seed coats. He also found that the micropyle of hard beans is covered with outside pallisade cells. These data suggest that fiber and calcium content, seed coat surface and micropyle structure are related to water absorption of soybeans. Later, Arechavaleta-Medina and Snyder (1981) reasoned that the cuticle is most likely the site of the water barrier in the seed coat of soybeans because the soaking of hard beans in methanol or ethanol for 24 hr at 20° C. made them permeable to water.

Soybean hulls are considered a by-product of soy processing. After separation from seeds during rolling or flaking, they are toasted and ground, then blended back with defatted soy meal to make a meal containing 44% protein. For a high protein (47–49%) meal, the hull is not blended in, but rather it is disposed of separately. At present, soy hulls are primarily used for animal feed. Since soy carbohydrates are mainly composed of α-cellulose and hemicellulose, which are low in lignin, they are easily digested by animals. In fact, they are so highly digested that their digestible energy content is essentially equal to grains. In addition, when used in high forage diets, soy hulls eliminate the risk of acidosis (Klopfenstein and Owen 1988).

For the last two decades, some new uses of soy hulls have been explored, particularly including the use of soy hulls, with an emphasis as a source of human food. Like dietary fiber from other sources, soy hulls have been shown to reduce blood serum cholesterol levels (Mahalko et al. 1984). So, soybeans hulls have been used as a fiber supplement for bakery products at a level up to 10% (Johnson et al. 1985). Soy hulls are also rich in iron; approximately 32% of the total seed iron is in soy hulls (Levine et al. 1982). Thus, they can be used as a iron supplement for such foods as baked goods and breakfast cereals (Johnson et al. 1985, Lykken et al. 1987). In addition to hulls and cotyledons, the third structural part of the soybean seed is the hypocotyl axis, or germ. Upon germination, the axis will grow into a new soybean plant. By weight, the hypocotyl axis is about 2.0% of the seed. In general, the axis has a protein content similar to that of cotyledons but contains about 10% less fat and 10% more insoluble carbohydrate than the cotyledon part. After cracking the soybeans, during the first step of soybean processing, the axis may be separated with the cotyledon or with the hull, depending on which structural part it adheres to.

Recently, Liu et al. (1 995b) investigated the fatty acid composition of the axis and its relationship with the fatty acid composition of cotyledons. The seed axis has the lowest relative percentages of stearic and oleic acids and the highest of linoleic and linolenic acids. Furthermore, regardless of the great variation in the fatty acid profile of the whole seeds among six selected soybean genotypes, the ratio of the concentration of a particular fatty acid in the axis to the corresponding concentration in the cotyledon is, for each of five major fatty acids, highly conserved. The average of the ratio across the six genotypes for each of the five fatty acids is as follows: for palmitic acid, 1.38±0.15; for stearic acid, 0.96±0.11; for oleic acid, 0.27±0.02; for linoleic acid, 1.17±0.12; and for linolenic acid, 2.22±0.22. This finding has two significant implications. First, it implies that lipid metabolism may be correlated in both the axis and cotyledon tissues during seed development. And second, with knowledge of the fatty acid composition of one tissue, one can predict that of the other. For example, if cotyledons are found to have 7.5% linolenic acid relative to total fatty acids from the tissue, the relative percentage of linolenic acid in the axis tissue would be around 16.7% (i.e., 7.5%×2.22).

It has been speculated that the hypocotyl axis is the source of the beany flavor and undesirable taste in soy products. One explanation for this hypothesis is that the soybean hypocotyl has the highest percentage of polyunsaturated fatty acids (Liu et al. 1995b) and the highest concentration of isoflavones (Kudo 1991). This is corroborated by the fact that some soyfood processors have succeeded in reducing the off flavor in their products by removing the axis and hulls during processing (Tsukamoto et al. 1991).

Because of the low proportion of the hypocotyl axis in the whole seed and difficulty in separating it from the other parts commercially, relatively few studies have been conducted on its food value. However, this does not necessarily mean that the axis is insignificant. Considering the fact that isoflavone concentration in the hypocotyl is about 5–6 times higher than in cotyledons (Kudou 1991), there may be a potential for a new use of the soybean axis.

Soybeans contain both soluble and insoluble types of fiber. Soy fiber can help regulate gastrointestinal function and reduce cholesterol levels. Soluble fiber is known to affect the absorption of blood glucose in humans.

In Lancet 1979, (Stephen Holt, M. D., et. al.) showed that soluble fiber delayed the rate at which the human stomach emptied its contents into the small bowel, which is the site of maximal absorption of glucose. Soluble fibers are absorbed and promote the smoothing out of the levels of blood glucose following ingestion of soy fiber in the diet.

Studies have confirmed these effects of gel fibers (soluble fibers), which are found in soy beans and a variety of fruits, vegetables, and plants.

A study of obese patients with Type II diabetes, published in the *American Journal of Clinical Nutrition* in 1987, showed the benefit of soy fiber in regulating blood glucose levels. The subjects were first given a meal that did not contain soy fiber, then their blood glucose levels were measured. As is typical in diabetic individuals, glucose levels rose rapidly and stayed high for longer than normal following the meal. However, when the same patients consumed an identical meal to which 10 grams of soy fiber were added, blood glucose levels returned to normal more quickly. Other studies have confirmed these findings. In one clinical experiment, soy fiber and cellulose, an insoluble fiber found in bran and vegetables, were compared in relation to their effects on blood sugar. Those participants in the experiment given soy fiber had lower blood glucose levels over a three-hour period than the participants who received cellulose.

In addition, the fiber in soy food products helps promote a sense of fullness or satiety, which can be important for overweight diabetics, a group for whom weight loss is essential. Anyone who has tried to diet knows that a constant sense of hunger is detrimental and ultimately leads to overeating, usually followed by another period during which too little food is consumed. A person with diabetes mellitus cannot safely engage in this "see-saw" of deprivation followed by overeating. Stabilizing the balance of glucose and insulin is impossible without careful planning and a disciplined approach to diet. Therefore, a food that promotes a sense of satiety is of particular value in assisting weight loss where required.

The soluble fiber absorbs water and thus increases the water content. If a person does increase fiber intake, he or she will probably experience increased thirst. Drinking plenty of water promotes weight maintenance, healthy kidneys and regularity of the bowels. Portions of the ingested soy are fermented in the colon to produce short-chain fatty acids, which stimulate colonic activity, but the insoluble fiber found in soy does not make the stool too bulky.

The soluble fiber in soy may have a specific role in preventing colon cancer. This is a complex issue that involves the production of, and balance of, bacteria in the colon.

A half-cup of boiled soybeans contains almost half (about 44%) the recommended daily allowance (RDA) of iron and a significant amount of calcium magnesium, and zinc. Thiamine, niacin, riboflavin, and vitamin B6 are also present in amounts significant enough to consider soybeans a good source of these B-complex vitamins. Mature soybeans are not a source of vitamin C, but soybean sprouts are.

Soy isoflavones also function as antioxidants. In this role, they neutralize the effects of free radicals, which have the ability to damage cells and impair immunity. Antioxidants are believed to have a significant role in preventing cancer or retarding its growth. The indications that soy contains many valuable anti-cancer substances are so strong that it has become the subject of many cancer prevention studies.

Dr. Herman Adlercreutz, Professor in the Department of Clinical Chemistry at the University of Helsinki, has performed a great deal of research on the effect of soy derived materials such as the effect of soy isoflavones on the maintenance of prostate health. Laboratory experiments with cultures of prostate cancer cells show an anti-tumor effect of soy isoflavones, and several animal studies have shown that transplanted prostate cancer in animals can have its growth retarded by genistein (a principal soy isoflavone).

Current research and clinical experience is leading more and more health care practitioners to recommend that mature men add at least two servings of soy food products to their daily diet. In addition, isoflavone supplements are available to both prevent and treat benign prostatic enlargement and possibly cancer of the prostate. Beneficial effects of high isoflavone intake have been reported in advanced prostate cancer, including reversal of symptoms of benign prostate hyperplasia with just modest intake of soy isoflavones.

Quaffing a soy drink containing isoflavones lowers total and LDL cholesterol levels by 5%–10% in moderately hypercholesterolemic men and women.

The results of a new double blind randomized controlled trial clearly demonstrate that it is the soy isoflavones, not soy protein, which are responsible for this cholesterol-lowering effect, as reported by Dr. John R. Crouse III at the Annual Conference on Cardiovascular Disease Epidemiology and Prevention sponsored by The American Heart Association.

A diet including 20 g of soy protein per day provides about 34 mg of isoflavones. Based on aggregate data, the FDA has suggested 25 g/day of soy protein as an effective and palatable consumption level.

A number of isoflavone supplements are widely available, but it remains unestablished whether these phytonutrients are as effective as whole soy proteins, which contain saponins and other nutrients.

The presence of saponins in the yellow soybean and soy beverages made therefrom is intriguing. Saponins may promote reduction of blood cholesterol, inhibit the formation of cancer, and also may help prevent heart disease. These phytochemicals may also have a role in promoting weight reduction and may also promote a reduction in the effects of aging.

SUMMARY OF THE INVENTION

The instant invention provides a method of preparing a texturized soy beverage which promotes weight loss and additionally provides ameliorative benefits as an adjunct to treatment of cardiovascular disease, type II diabetes mellitus, hypertension, dyslipidemia, osteoporosis, Alzheimer's disease, breast cancer uterine cancer, colon cancer, prostate cancer and kidney disease.

The texturized soy beverage of the instant invention provides a nutritional supplement which contains high amounts of soy protein, phyto-nutrients, both soluble and insoluble types of fiber and contains beneficial types of fats, such as omega-3 and omega-6 fatty acids. Furthermore, one serving of SAPONIN WHITE™ soy beverage, prepared as described hereinbelow, contains 14.3 g of soy-protein and phytonutrients.

The fiber in the texturized soy beverage helps promote a sense of fullness or satiety, which can be beneficial for overweight and obese individuals in the promotion of weight loss.

Patients, after ingesting the texturized soy beverage prepared according to the invention, become thirsty and drink increased amounts of water. The higher intake of water promotes weight maintenance, promotes regularity of the bowels, and promotes healthy kidneys. In addition, soluble fiber in the texturized soy beverage absorbs water after ingestion and thus increases the water content.

The texturized soy beverage of the invention, SAPONIN WHITE™, when administered as a nutritional supplement for the promotion of weight loss, has no complication of constipation and promotes negative proteinuria.

In an embodiment of the invention, the texturized soy beverage suitable for human consumption is prepared according to the following method:

- providing clean whole soybeans having their outer hulls;
- combining the soybeans with water sufficient to cover the soybeans to form a first mixture and allowing the soybeans to soak in the water in an approximately 2° C. temperature environment for between approximately eight and approximately ten hours;
- adding additional fresh water to the first mixture to form a second mixture and placing in a cooking vessel, having a lid, a third mixture comprising said soybeans and a sufficient portion of water from the second mixture to cover the soybeans in said cooking vessel;
- covering the cooking vessel with the lid and placing a heat source in thermal communication with the cooking vessel to cook the soybeans until a foam accumulates inside the cooking vessel and the foam contacts the lid of the cooking vessel;
- separating the cooking vessel from the heat source and keeping the cooking vessel covered with the lid for at least 2 minutes;
- removing the lid from the cooking vessel, separating the water from the soybeans, and drying the soybeans;
- forming a fourth mixture by blending 1 part by volume of the soybeans with between ½ part and 2 parts by volume of a material selected from the group comprising fat-free milk, fruit and vegetables;
  - wherein the fourth mixture is blended such that at least some of the soybeans in said fourth mixture remain in small pieces of sufficient size, preferably between 0.023 and 0.3 inches in size, such that the small pieces of soybean may be chewed before being swallowed.

This procedure of the invention may cause metabolic changes or biochemically alter some substance in the texturized soy beverage so as to promote improved kidney function.

It has been discovered that whole soybeans may be rendered palatable while providing high nutritional value by preparing the texturized soy beverage product according to the invention.

DETAILED DESCRIPTION AND PREFERRED EMBODIMENT

The SAPONIN WHITE™ texturized soy beverage of the instant invention, in one serving, contains 14.3 g of soy protein, almost half (about 44%) of the recommended daily allowance of iron, and also a significant amount of calcium, magnesium, zinc, thiamin, niacin, riboflavin and vitamin B6. Preferably the texturized soy beverage of the instant invention is consumed in sufficient quantity to provide the FDA-suggested amount of 25 g per day of soy protein. More preferably, the texturized soy beverage of the instant invention is consumed such that isoflavones are ingested at a rate of at least approximately 30 to 40 mg/day.

The fiber in the texturized soy beverage of the instant invention helps promote a sense of fullness or satiety, induces thirst, and promotes the drinking of increased amounts of water. The higher intake of pure water is promotes weight maintenance, promotes regularity of the bowels, and promotes maintenance of healthy kidneys.

The general recommendation that everyone consume daily 6 to 8 eight ounce glasses of water is especially important for stone-forming persons or for others whom are at risk for dehydration.

The texturized soy beverage in accordance with the instant invention provides soy in the form of texturized vegetable protein drink which is known by the tradename SAPONIN WHITE™. Because it is filling and satisfying, rich in the basic nutrients of protein, carbohydrates without starches, and fat, and because it can be prepared according to the invention in a great variety of forms, a texturized soy beverage nutritional supplement according to the invention is the perfect dieter's beverage.

The present invention provides a process for preparing a nutritive composition for use in a weight loss program comprising the steps of soaking clean whole soybeans in water at a low temperature for several hours, rinsing the beans and placing beans with sufficient water to cover the beans in a cooking vessel, heating the beans in the cooking vessel while covered by exposing the cooking vessel to a heat source until foam accumulates inside the cooking vessel, removing the heat source from the cooking vessel and keeping the cover on the cooking vessel for a period of at least 2–3 minutes, then draining the soybeans, adding fat-free milk, fruit or vegetables and blending to form a mixture which contains some solid soybean particles, preferably having sizes greater than approximately 0.023 inches and more preferably having sizes in the range of approximately 0.023 inches to approximately 0.3 inches.

The blended soy composition preferably contains a water soluble component of soybean derived materials and variously sized solid soybean particles (particularly soybean particles having sizes in the range from around 0.023 to 0.3 inches) which provided the texturized characteristics of the texturized soy beverage of the invention. The amount and distribution of these solid particles sizes may vary depending on the blending time. Neither a disintegrator nor a screen or filter need be used. Therefore, the presence of solid soybean particles is ensured. The composition, when consumed, promotes weight loss, weight management and receipt of proper nutrition.

In further embodiments of the invention, methods are provided for preparing the above-described soybean-based composition combined with fruits and vegetables to provide improved flavor, fiber, nutritional benefits, or patient acceptance.

The following Tables 1–5 illustrate the comparative nutrient and isoflavone content of cooked soybeans, various soymilks, cow's milk, human breast milk. The texturized soy beverage in accordance with the instant invention differs essentially from soymilks in that it contains chewable soybean particles, preferably between 0.023 and 0.3 inches in size, which provide texture, promote chewing, greater consumption of water, and weight loss and weight maintenance and other benefits when ingested.

TABLE 1

NUTRIENTS IN ½ CUP COOKED SOYBEANS*

| | |
|---|---|
| Calories | 149 |
| Protein | 14.3 g |
| Total fat | 7.7 g |
| Saturated fat | 1.1 g |
| Unsaturated fat | 6.6 g |
| Carbohydrate | 8.5 g |
| Fiber | 1.8 g |
| Calcium | 88 mg Iron |
| Iron | 4.4 mg |
| Zinc | 1.0 mg |
| Magnesium | 25.2 mg |
| Thiamine | 0.1 mg |
| Riboflavin | 0.3 mg |
| Niacin | 0.3 mg |
| Vitamin $B_1$ | 0.2 mg |
| Folacin | 46.2 mg |

TABLE 2

Composition of Soymilk, Cow's Milk, and Human Breast Milk

| Item/100 g | Soymilk | Cow's Milk | Human Milk |
|---|---|---|---|
| Calorie | 44 | 59 | 62 |
| Water (g) | 90.8 | 88.6 | 88.2 |
| Protein | 3.6 | 2.9 | 1.4 |
| Fat | 2.0 | 3.3 | 3.1 |
| Carbohydrates | 2.9 | 4.5 | 7.1 |
| Ash | 0.5 | 0.7 | 0.2 |
| Minerals (mg) | | | |
| Calcium | 15 | 100 | 35 |
| Phosphorous | 49 | 90 | 25 |
| Sodium | 2 | 36 | 15 |
| Iron | 1.2 | 0.1 | 0.2 |
| Vitamins (mg) | | | |
| Thiamine (B1) | 0.03 | 0.04 | 0.02 |
| Riboflavin (B2) | 0.02 | 0.15 | 0.03 |
| Niacin | 0.50 | 0.20 | 0.20 |
| Saturated fatty acids (%) | 40–48 | 60–70 | 55.3 |
| Unsaturated fatty acid (%) | 52–60 | 30–40 | 44.7 |
| Cholesterol (mg) | 0 | 9.24–9.9 | 9.3–18.6 |

Source: Data adapted from Chen (1989).

TABLE 3

Approximate Composition of Three Basic Categories of Soymilk

| Soymilk | Water:beans ratio | Cups/Kg beans | Solids (%) | Protein (%) | Fat (%) |
|---|---|---|---|---|---|
| Rich | 5:1–6:1 | 15–19 | 10–11.5 | 4.5–5.2 | 2.8–3.2 |
| Dairylike | 8:1–8.5:1 | 28–31 | 7.4–8 | 3.3–3.6 | 2.1–2.3 |
| Economy | 10:1 | 37–40 | 6 | 2.7–3.3 | 1.2–1.6 |

Source: Data adapted from Chen (1989)

TABLE 4

Changes in Soybean Isoflavones as Affected by Soaking

| | Isoflavone contents[3] | | | | | |
|---|---|---|---|---|---|---|
| | Glucosides | | Aglucones | | | |
| Treatment | Daidzin | Genistin | Daidzein | Genistein | Total | A/T ratio[b] (%) |
| Before Soak | 115.2 | 181.1 | 5.1 | 4.9 | 306.3 | 3.3 |
| After Soak[c] | 97.4 | 119.8 | 14.7 | 24.3 | 256.2 | 15.2 |

Source: Data adapted from Matsuura et al. (1989).
[a]Average of two replicates, expressed as mg/100 g dry matter basis.
[b]A/T ratio = ratio of aglucones/total isoflavones.
[c]Soybean samples were soaked at 20° C. for 16 hr

TABLE 5

Objectionable Aftertaste and the Amount of Daidzein and Genisten Present in Soymilk as Affected by Soaking in Various Concentrations of Glucono-δ-Lactone

| | Glucosides-δ-lactone (w/w %) | | Isoflavone content[b] (mg/100 mL) | | Soymilk |
|---|---|---|---|---|---|
| No. | Soak solution | Amount incorporated into soybeans[d] | Daidzein | Genistein | Panel-score[d] |
| 1 | Tap water | 0 | 1.6[d] | 1.9[d] | 3.9[d] |
| 2 | 0.0015 | 0.001 | 1.5[d] | 1.8[d] | 3.8[d] |
| 3 | 0.015 | 0.01 | 0.9[c] | 1.0[d] | 2.5[c] |
| 4 | 0.15 | 0.1 | 0.5' | 0.6' | 1.5' |
| 5 | 1.5 | 1.0 | 0.3' | 0.4' | 0.6' |

Source: From Matsuura et al. (1989).
[d]Calculated from the amount of the aqueous glucono-δ-lactone solution absorbed in the soybeans after the soaking.
[b]Average of two replicates.
'Based on a scale of 0 = no objectionable aftertaste to 4 = very strong objectionable aftertaste.
[d]Means with different superscripts within the same column are significantly different (p ≤ 0.05).

The invention and preferred embodiments are further illustrated by the following examples.

EXAMPLE 1

SAPONIN WHITE™ Texturized Soy Beverage

Ingredients:

Makes: One serving

Yellow soybeans: (half cup, cooked)

Skim Milk or Skim Plus (one or one-half cups)

Sorting and grading:

Yellow soybeans: organically grown, cleaned, sorted and graded by size

Cooking Procedure

Clean whole soybeans are processed by soaking in lots of tap water and kept covered at 2 degrees C. temperature for 6 to 8 hours. Run under cold water, leave ½ inch water to cover soybeans in the pot. Must keep pot covered, it is very important to avoid bean smell. Under medium heat, allow beans to cook until the layer of foam which forms on the top of the mixture reaches the cover. It would be preferable to use a clear glass cover. Turn the heat off, cook lightly for 5 to 6 minutes, avoid over cooking, as this is the cause of beany odor. Do not uncover, wait 2–3 minutes. This process is very important for soybeans outer hull. Drain and gently pat dry the soybeans. Dilute with fat free milk and whole soybeans, include outer hulls, and blend.

The blended texturized soy beverage contains a water soluble component and various sizes of chewable solid soybean particles (around 0.023 to 0.3 inches). These solid particles are different sizes depending on the blending time. Also, a screen is not used.

Formulation:

Yellow soybeans blended with skim milk, or skim milk plus decreases the soybean smell and adds flavor.

Sterilization:

Passed through an ultra high temperature sterilizer at 142 degrees C. for three seconds, then immediately sent through a plate cooler at 10 degrees C.

Aseptic packaging

EXAMPLE 2

SAPONIN WHITE™ Honey Texturized Soy Beverage

Ingredients:

Makes: One serving

Yellow soybeans: (half cup, cooked)

Skim Milk or Skim Plus (one or one-half cups)

Honey (one to three teaspoons) or sugar (one to three teaspoons)

Sorting and grading:

Yellow soybeans: organically grown, cleaned, sorted and graded by size

Cooking Procedure

Clean whole soybeans are processed by soaking in lots of tap water and keep covered at 2 degrees C. temperature for 6 to 8 hours. Run under cold water, leave ½ inch water to cover soybeans in the pot. Must keep pot covered, it is very important to avoid bean smell. Under medium heat, allow beans to cook until the layer of foam which forms on the top of the mixture reaches the cover. It would be preferable to use a clear glass cover. Turn the heat off, cook lightly for 5 to 6 minutes, avoid over cooking, as this is the cause of beany odor. Do not uncover, wait 2–3 minutes. This process is very important for soybeans outer hull. Drain and gently pat dry the soybeans. Dilute with fat free milk, sweetener and whole soybeans, include outer hulls, and blend. The blended texturized soy beverage contains a water soluble component and various sizes of chewable solid soybean particles (around 0.023 to 0.3 inches). These solid particles are different sizes depending on the blending time. Also, a screen is not used.

Formulation:

Yellow soybeans blended with skim milk, or skim milk plus and honey decreases the soybean smell and adds flavor.

Sterilization:

Passed through an ultra high temperature sterilizer at 142 degrees C. for three seconds, then immediately sent through a plate cooler at 10 degrees C.

Aseptic packaging

EXAMPLE 3

SAPONIN WHITE™ Sorbet Texturized Soy Beverage

Ingredients:

Makes: One serving

Yellow soybeans: (half cup, cooked)

Skim Milk or Skim Plus (one or one-half cups)

Honey (one to three teaspoons) or sugar (one to three teaspoons)

Sorbet (Lemon Zest, mango, peach, strawberries) one scoop or two scoops.

Sorting and grading:

Yellow soybeans: organically grown, cleaned, sorted and graded by size

Cooking Procedure

Clean whole soybeans are processed by soaking in lots of tap water and keep covered at 2 degrees C. temperature for 6 to 8 hours. Run under cold water, leave ½ inch water to cover soybeans in the pot. Must keep pot covered, it is very important to avoid bean smell. Under medium heat, allow beans to cook until the layer of foam which forms on the top of the mixture reaches the cover. It would be preferable to use a clear glass cover. Turn the heat off, cook lightly for 5 to 6 minutes, avoid over cooking, as this is the cause of beany odor. Do not uncover, wait 2–3 minutes. This process is very important for soybeans outer hull. Drain and gently pat dry the soybeans. Dilute with fat free milk, honey, sorbet and whole soybeans, include outer hulls, and blend. The blended texturized soy beverage contains a water soluble component and various sizes of chewable solid soybean particles (around 0.023 to 0.3 inches). These solid particles are different sizes depending on the blending time. Also, a screen is not used.

Formulation:

Yellow soybeans blended with skim milk, or skim milk plus, honey or without honey and sorbet (choice of one of Lemon Zest, mango, peach, strawberries) decreases the soybean smell and adds flavor.

Sterilization:

Passed through an ultra high temperature sterilizer at 142 degrees C. for three seconds, then immediately sent through a plate cooler at 10 degrees C.

Aseptic packaging

EXAMPLE 4

SAPONIN PINK™ (for the Lactose Intolerant) Texturized Soy Beverage

Ingredients:

Makes: One serving

Yellow soybeans: (half cup, cooked)

Apples (six and one-half ounces)

Carrots (three and one-half ounces)

Sorting and grading:

Yellow soybeans: organically grown, cleaned, sorted and graded by size

Apples: Fuji variety, remove skin and seeds

Carrots: medium size, remove skin

Cooking Procedure

Clean whole soybeans are processed by soaking in lots of tap water and keep covered at 2 degrees C. temperature for 6 to 8 hours. Run under cold water, leave ½ inch water to cover soybeans in the pot. Must keep pot covered, it is very important to avoid bean smell. Under medium heat, allow beans to cook until the layer of foam which forms on the top of the mixture reaches the cover. It would be preferable to use a clear glass cover. Turn the heat off, cook lightly for 5 to 6 minutes, avoid over cooking, as this is the cause of beany odor. Do not uncover, wait 2–3 minutes. This process is very important for soybeans outer hull. Drain and gently pat dry the soybeans. Dilute with fruit and vegetable and whole soybeans, include outer hulls, and blend. The blended texturized soy beverage contains a water soluble component and various sizes of chewable solid soybean particles (around 0.023 to 0.3 inches). These solid particles are different sizes depending on the blending time. Also, a screen is not used.

Raw apples and carrots liquids:

Raw apples and raw carrots are extractions. This can be done either by pressing sack or centrifugation.

Formulation:

Yellow soybeans blended with apples and carrots liquids, decreases the soybean smell and adds flavor.

Sterilization:

Passed through an ultra high temperature sterilizer at 142 degrees C. for three seconds, then immediately sent through a plate cooler at 10 degrees C.

Aseptic packaging

EXAMPLE 5

SAPONIN CINNAMON Texturized Soy Beverage

Ingredients:

Makes: One serving

Yellow soybeans: (half cup, cooked)

Ginger and Cinnamon syrup (one to one-half cups)

Honey (one to three tablespoons) or sugar (one to three tablespoons)

Sorting and grading:

Yellow soybeans: organically grown, cleaned, sorted and graded by size

Cooking Procedure

Clean whole soybeans are processed by soaking in lots of tap water and keep covered at 2 degrees C. temperature for 6 to 8 hours. Run under cold water, leave ½ inch water to cover soybeans in the pot. Must keep pot covered, it is very important to avoid bean smell. Under medium heat, allow beans to cook until the layer of foam which forms on the top of the mixture reaches the cover. It would be preferable to use a clear glass cover. Turn the heat off, cook lightly for 5 to 6 minutes, avoid over cooking, as this is the cause of beany odor. Do not uncover, wait 2–3 minutes. This process is very important for soybeans outer hull. Drain and gently pat dry the soybeans. Dilute with ginger cinnamon syrup and whole soybeans, include outer hulls, and blend. The blended texturized soy beverage contains a water soluble component and various sizes of chewable solid soybean particles (around 0.023 to 0.3 inches). These solid particles are different sizes depending on the blending time. Also, a screen is not used.

Cinnamon and Ginger Syrup:

One-quarter ounce whole cinnamon sticks

One-third lb ginger

Cut 2–3 inches length whole cinnamon sticks. Wash and scrape the ginger and slice it thinly. Simmer the ginger and cinnamon sticks with 13 cups cold water under low heat to boil until the strong taste draws well (thirty minutes). Add the sugar or honey. Briefly boil again (five minutes).

Pour this liquid through a fine sieve and put in the refrigerator to cool.

Formulation:

Yellow soybeans blended with ginger cinnamon syrup decreases the soybean smell and adds flavor.

Sterilization:

Passed through an ultra high temperature sterilizer at 142 degrees C. for three seconds, then immediately sent through a plate cooler at 10 degrees C.

Aseptic packaging

EXAMPLE 6

SAPONIN WHITE™ Topping Texturized Soy Beverage

Ingredients:

Makes: One serving

Yellow soybeans: (half cup, cooked)

Skim milk or skim milk plus (half cup)

Apples (three and one-half ounces)

Sugar (one-two tablespoons) or honey (one to three teaspoons)

Banana (two or three whole, cut into six or eight slices)

Melon (one ounce, chopped)

Mango (one ounce, chopped)

Peach (two or three thin slices)

Sorting and grading:

Yellow soybeans: organically grown, cleaned, sorted and graded by size

Apples: Fuji variety, remove skin and seeds

Banana: peel and slice

Mango: medium size, remove skin and seed

Strawberries: remove leaves, wash with cold salt water mixture (one-half teaspoon salt to one cup water) for one minute. Wash again with cold water and drain. Add one tablespoon of sugar and stir for two to three minutes.

Peach: skin and slice

Melon: skin and slice

Cooking Procedure

Clean whole soybeans are processed by soaking in lots of tap water and keep covered at 2 degrees C. temperature for 6 to 8 hours. Run under cold water, leave ½ inch water to cover soybeans in the pot. Must keep pot covered, it is very important to avoid bean smell. Under medium heat, allow beans to cook until the layer of foam which forms on the top of the mixture reaches the cover. It would be preferable to use a clear glass cover. Turn the heat off, cook lightly for 5 to 6 minutes, avoid over cooking, as this is the cause of beany odor. Do not uncover, wait 2–3 minutes. This process is very important for soybeans outer hull. Drain and gently pat dry the soybeans. Dilute with fat free milk, fruit, sweetener and whole soybeans, include outer hulls, and blend.

The blended texturized soy beverage contains a water soluble component and various sizes of chewable solid soybean particles (around 0.023 to 0.3 inches). These solid particles are different sizes depending on the blending time. Also, a screen is not used.

Formulation:

Yellow soybeans blended with skim milk or skim plus or sweetener and fruit decreases the soybean smell and adds flavor.

Sterilization:

Passed through an ultra high temperature sterilizer at 142 degrees C. for three seconds, then immediately sent through a plate cooler at 10 degrees C.

Aseptic packaging

EXAMPLE 7

The texturized soy beverage was prepared according to one or more of the foregoing formulations and administered to persons under treatment for obesity and proteinuria. A first patient having protein in urine as detected from standard clinical testing showed normal urine without proteinuria approximately two months after commencing consumption of the texturized soy beverage of the instant invention. Continued practice of the invention for an additional seven months resulted in continued absence of proteinuria in the patient.

A second patient (female and 5' 4" in height) consumed the texturized soy beverage as prepared according to the invention for two months and experienced a steady decline in weight from 180 lbs to 156 lbs with a corresponding percentage body fat changing from 50% to 46%.

A third patient (female and 5' 2" in height) consumed the texturized soy beverage as prepared according to the invention for eleven months and experienced a mostly steady decline in weight from 221 lbs to 152 lbs with a corresponding percentage body fat changing from 68% to 43%. The same patient during the same period experienced a reduction in the patient's elevated levels of blood cholesterol and triglycerides as measured according to standard laboratory testing protocols.

I claim:

1. A method for preparing a texturized soy beverage suitable for human consumption, said method comprising:

providing whole soybeans that are clean and have intact outer hulls;

soaking said soybeans in water for approximately 6 to approximately 8 hours in a covered vessel, said water being present in an amount sufficient to cover said soybeans and having a temperature of approximately 2 degrees C., said soaking water being discarded after said soaking step;

rinsing said soaked soybeans with fresh water and draining said rinsed soybeans such that said hulls remain intact;

cooking said soybeans in new fresh water in a covered cooking vessel; said new fresh water in said cooking vessel being sufficient to immerse said soybeans in said vessel by ½ inch and said new fresh water being heated with a cooking medium heat source to boiling for approximately 5–6 minutes during said cooking step until a foam forms on the new fresh water in the cooking vessel and reaches the cover of said cooking vessel;

removing said cooking heat source from said cooking vessel to stop boiling of the new fresh water in the cooking vessel, said soybeans then being left to stand in said covered cooking vessel for approximately 2 to 3 minutes;

draining the contents of the cooking vessel to separate said cooking water from said soybeans so as to retain said cooked soybeans. and any loose soybean hulls;

blending said soybeans and said loose soybean hulls so as to form a texturized beverage comprising 1 part by volume soybean and loose soybean hulls and between ½ part and 2 parts by volume of a material selected from the group consisting of fat-free milk, water, whole fruit pieces and whole vegetable pieces, wherein said blending is conducted such that said texturized beverage contains intact pieces of soybean at least 0.023 inch in size that may be chewed before being swallowed during human consumption.

2. The method according to claim 1, wherein said chewable pieces of soybean contained in said texturized beverage are approximately 0.30 inch in diameter.

3. The method according to claim 1, wherein said blending step comprises blending said soybean and said loose soybean hulls with a material from the group consisting of fat-free milk and water and with a second material selected from the group consisting of whole fruit pieces and whole vegetable pieces.

4. The method according to claim 3, wherein said whole fruit pieces are selected from the group consisting of apples, melons, mangoes, peaches, strawberries and bananas.

5. The method according to claim 1, further comprising sterilizing said texturized soy beverage after said blending step by passing said beverage through a high temperature sterilizer at 142 degrees C. for 3 seconds and then immediately sending the beverage to a plate cooler at 10 degrees C.

6. The method according to claim 1, wherein said soybeans are yellow variety soybeans.

7. The method according to claim 1, wherein said blending step comprises combining said cooked soybeans and loose soybean hulls blended with a mixture comprising tap water, and liquid extract of fresh apple and fresh carrot, said apple and said carrot being present in said liquid extract in 6½ parts apple to 3½ parts carrot.

8. The method according to claim 1, wherein said blending step comprises combining ½ cup of said cooked soybeans and said loose soybean hulls with ½ cup to 1 cup of a syrup, or equivalent portions thereof and wherein said syrup comprises water, ginger and cinnamon.

9. The method according to claim 8, wherein said blending step further comprises combining 1 to 3 tablespoons of a sweetener selected from the group consisting of honey and sugar with said ½ cup of said cooked soybeans and said loose soybean hulls and said ½ cup to 1 cup of said syrup, or equivalent portions thereof.

10. The method according to claim 1, wherein said blending step comprises combining ½ cup of said cooked soybeans and said loose soybean hulls with 1 to 2 tablespoons of honey and 1 cup of a liquid selected from the group consisting of fat-free milk and water, or equivalent portions of.

11. The method according to claim 10, wherein said blending step comprises combining ½ cup of said cooked soybeans and said loose soybean hulls with ½ cup of fruit sorbet and ½ cup of fat-free milk, or equivalent portions thereof.

12. The method according to claim 1, wherein a transparent lid is used during said cooking step to cover said cooking vessel.

13. A method for preparing a texturized soy beverage wherein consumption of said beverage by a human in a nutritionally acceptable amount helps promote negative proteinuria in said human, said method comprising:

providing whole soybeans that are clean and have intact outer hulls; said soybeans being of the yellow variety;

soaking said soybeans in water for approximately 6 to approximately 8 hours in a covered vessel, said water being present in an amount sufficient to cover said soybeans and having a temperature of approximately 2 degrees C., said soaking water being discarded after said soaking step;

rinsing said soaked soybeans with fresh water and draining said rinsed soybeans such that said hulls remain intact;

cooking said soybeans in new fresh water in a covered cooking vessel; said new fresh water in said cooking vessel being sufficient to immerse said soybeans in said vessel by ½ inch and said new fresh water being heated with a cooking medium heat source to boiling for approximately 5–6 minutes during said cooking step until a foam forms on the new fresh water in the cooking vessel and reaches the cover of said cooking vessel;

removing said cooking heat source from said cooking vessel to stop boiling of the new fresh water in the cooking vessel, said soybeans then being left to stand in said covered cooking vessel for approximately 2 to 3 minutes;

draining the contents of the cooking vessel to separate said cooking water from said soybeans so as to retain said cooked soybeans and any loose soybean hulls;

blending said soybeans and said loose soybean hulls so as to form a texturized beverage comprising 1 part by volume soybean and loose soybean hulls and between ½ part and 2 parts by volume of a material selected from the group consisting of fat-free milk, water, whole fruit pieces and whole vegetable pieces, wherein said blending is conducted such that said texturized beverage contains intact pieces of soybean at least 0.023 inch in size that may be chewed before being swallowed during human consumption.

14. The method according to claim 13, wherein said chewable pieces of soybean contained in said texturized beverage are approximately 0.30 inch in diameter.

15. The method according to claim 13, wherein said blending step comprises blending said soybean and soybean hulls with a material from the group consisting of fat-free milk and water and with a second material selected from the group consisting of whole fruit pieces and whole vegetable pieces.

16. The method according to claim 15, wherein said whole fruit pieces are selected from the group consisting of apples, melons, mangoes, peaches, strawberries and bananas.

17. The method according to claim 13, further comprising sterilizing said texturized soy beverage after said blending step by passing said beverage through a high temperature sterilizer at 142 degrees C. for 3 seconds and then immediately sending the beverage to a plate cooler at 10 degrees C.

18. The method according to claim 13, further comprising wherein said blending step comprises combining ½ cup of said cooked soybeans and said loose soybean hulls with 1 to 2 tablespoons of honey and 1 cup of a liquid selected from the group consisting of fat-free milk and water, or equivalent portions of.

19. The method according to claim 13, wherein said blending step comprises combining said cooked soybeans and loose soybean hulls blended with a mixture comprising tap water, and liquid extract of fresh apple and fresh carrot, said apple and said carrot being present in said liquid extract in 6½ parts apple to 3½ parts carrot.

20. The method according to claim 13, wherein said blending step comprises combining ½ cup of said cooked soybeans and said loose soybean hulls with ½ cup to 1 cup of a syrup, or equivalent portions thereof and wherein said syrup comprises water, ginger and cinnamon.

* * * * *